United States Patent Office 3,830,871
Patented Aug. 20, 1974

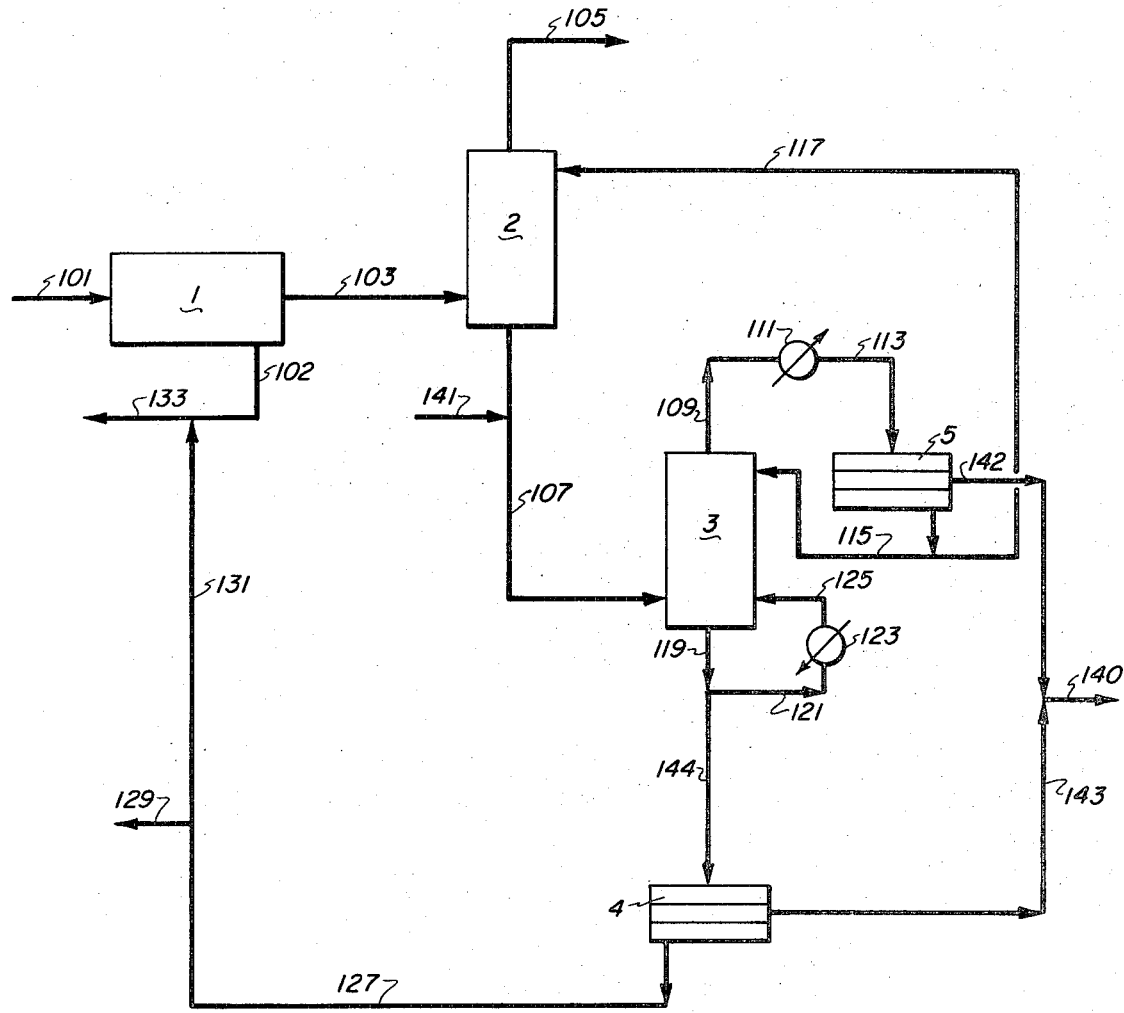

3,830,871
REMOVAL OF A METAL PENTAFLUORIDE
FROM HYDROCARBONS
Ivan Mayer, Summit, Michael Siskin, Maplewood, and Thomas G. Otchy, Fanwood, N.J., assignors to Esso Research and Engineering Company
Filed July 2, 1973, Ser. No. 375,662
Int. Cl. C10g 17/00
U.S. Cl. 260—683.68
21 Claims

ABSTRACT OF THE DISCLOSURE

A metal pentafluoride, such as, tantalum pentafluoride contained in a hydrocarbon stream is removed therefrom by contacting the stream with substantially anhydrous liquid hydrogen fluoride. The resulting extract may be subjected to distillation to remove overhead a portion of the hydrogen fluoride for reuse in the contacting step. The distillation bottoms portion is recovered for use, for example, in a hydrocarbon conversion process.

BACKGROUND OF THE INVENTION

1. Field of the Invention

This invention relates to the removal of a metal pentafluoride, such as, tantalum pentafluoride, niobium pentafluoride or mixtures thereof from hydrocarbon streams. It particularly relates to the removal and recovery of minor amounts of a metal pentafluoride from hydrocarbon streams resulting from hydrocarbon conversion processes wherein the metal pentafluoride is employed in the catalyst.

2. Description of the Prior Art

It is known that tantalum pentafluoride or niobium (columbium) pentafluoride in combination with liquid hydrogen fluoride can be used as catalyst in numerous hydrocarbon conversion processes including cracking, isomerization, alkylation and other reactions. Generally, in these conversion processes, the reaction zone effluent is subsequently separated by settling into two phases, namely, a predominantly hydrocarbon phase and a predominantly acid catalyst phase. Although the major portion of the metal pentafluoride that was present in the conversion zone effluent settles in the acid phase, a minor but significant amount of the metal pentafluoride along with some HF is carried over into the hydrocarbon phase. The concentration of the metal pentafluoride in such hydrocarbon streams may range from about 5 to 10,000 weight parts per million. Although this amount of metal pentafluoride in the hydrocarbon stream may be small, its presence gives rise to numerous difficulties in the process equipment, such as fouling and corrosion of the equipment. Furthermore, the loss of this amount of metal pentafluoride represents a considerable economic disadvantage. The removal of trace amounts of metal pentafluoride from hydrocarbon streams would be beneficial so as to prevent the risk of process equipment fouling and corrosion due to its presence. The recovery of this trace amount of metal pentafluoride for reuse as catalyst would also represent a cost saving.

It is also known that $TaF_5$ is appreciably soluble in substantially anhydrous liquid HF (see U.S. Pat. 2,683,-764). Furthermore, this patent teaches that tantalum pentafluoride in combination with HF can be used to refine hydrocarbon oils or to separate individual dialkylbenzene isomers from mixtures thereof (see also U.S. Pat. 2,683,763 for the separation of lower dialkylbenzenes with $CbF_5$). U.S. Pat. 3,358,048 discloses a process for removing trace amounts of aluminum chloride from hydrocarbon streams by contacting the stream with an aqueous solution of hydrogen chloride.

It has now been found that minor amounts of $TaF_5$ can be removed from a hydrocarbon stream by extracting the hydrocarbon stream with substantially anhydrous liquid HF under specified conditions.

SUMMARY OF THE INVENTION

In accordance with the invention, there is provided a process for removing a metal pentafluoride selected from the group consisting of tantalum pentafluoride, niobium pentafluoride and mixtures thereof from a hydrocarbon stream containing the same, which comprises contacting said stream with substantially anhydrous liquid hydrogen fluoride at a temperature in the range of about 0 to 200° F. and at a pressure in the range of about 20 to 250 p.s.i.g., and recovering a hydrocarbon stream having a reduced content of said metal pentafluoride.

In one embodiment of the invention, at least a portion of the hydrogen fluoride used as solvent is removed from the extract phase and, if desired, recycled for use in the contacting step.

BRIEF DESCRIPTION OF THE DRAWING

The figure is a diagrammatic flow plan of one embodiment of the invention.

PREFERRED EMBODIMENTS OF THE INVENTION

The preferred embodiments of the invention will be described with reference to the accompanying figure and with tantalum pentafluoride as the metal pentafluoride contained in a hydrocarbon stream.

Referring to figure, an effluent of a hydrocarbon conversion zone in which a reaction was conducted in the presence of a catalyst comprising an acid and tantalum pentafluoride is introduced into a settling vessel 1 where a phase separation occurs to yield a predominantly acid phase containing a major portion of the $TaF_5$ that was present in the conversion zone effluent and into a predominantly hydrocarbon phase containing a minor amount of dissolved and entrained $TaF_5$. Typically, the dissolved and entrained $TaF_5$ amounts to about 5 to about 10,000 weight parts per million of the total hydrocarbon phase. The acid phase is removed via line 102 for recycle to the conversion zone. The predominantly hydrocarbon phase containing trace amounts of $TaF_5$ is removed via line 103 and introduced into a contacting tower 2. The contacting tower can be any conventional tower or column suitable for conducting countercurrent liquid-liquid extraction. The tower can be packed with HF-resistant contact materials such as Raschig rings, Berl saddles, etc. Although the contacting step of the preferred embodiment is carried out in a liquid-liquid extraction type of tower, any suitable type of vessel for contacting two liquids can be used. The contacting step may, for example, be conducted in multistaged, countercurrent mixing-settling vessels to produce a mixture which is subsequently allowed to settle and separate into two phases.

Returning to the figure, a solvent stream of substantially anhydrous liquid HF is introduced via line 117 into tower 2 to contact the hydrocarbon stream countercurrently.

By substanially anhydrous liquid HF is intended to mean that the liquid HF does not contain more than about 2 weight percent of water.

The contacting step is conducted at a temperature in the range of about 0 to about 200° F., preferably in the range of about 65 to about 150° F. and more preferably at about 100° F. and at a pressure in the range of about 20 to 250 pounds per square inch gauge (p.s.i.g.), preferably in the range of about 40 to 180 p.s.i.g., more preferably at about 130 p.s.ig. The volume ratio of total treating solvent to hydrocarbon stream may range from about 1:100 to 1:1, preferably from about 1:50 to 1:5, more preferably a solvent to hydrocarbon stream ratio of about 1:17.

Contact of the hydrogen fluoride solvent with the hydrocarbon stream preferentially extracts $TaF_5$ into the solvent. The thus extracted hydrocarbon stream having a reduced $TaF_5$ content (the raffinate) is removed from the tower 2 via line 105. The extract comprising the HF solvent, some hydrocarbon material, and the $TaF_5$ which has been removed from the hydrocarbon stream, is passed via line 107 into a distillation tower 3 to recover a portion of the HF from the extract. Line 141 may be used to supply make-up HF from elsewhere in the system. Alternatively, a portion of the HF could be removed from line 107 by flash distillation. The top of tower 3 is operated at a temperature in the range from about 80 to 130° F., preferably from about 90 to 110° F., more preferably at about 100° F., and a pressure ranging from about 10 to 30 p.s.i.g., preferably at about 13 p.s.i.g. The tower is preferably refluxed with HF to minimize $TaF_5$ in the overhead. The overhead conditions are selected to minimize or prevent $TaF_5$ from being carried overhead. The bottom temperature and pressure of the tower are adjusted to yield a bottoms composition of the desired ratio of $HF/TaF_5$ which would be suitable for use as catalyst in a hydrocarbon conversion zone. In addition, the weight ratio of $HF/TaF_5$ may be adjusted to obtain a ratio ranging from about 10% to about 100%, preferably 50% greater than that required for dissolving all the $TaF_5$ at the reboiler (to be described below) outlet temperature but not less than the ratio desired in the hydrocarbon conversion zone. Suitable temperatures for the bottom of the tower would range from about 100 to 150° F. and a pressure from about 15 to about 45 p.s.i.g. A portion of the HF and hydrocarbon material is removed overhead from tower 3 via line 109, passed through a heat exchanger 111 to condense it. This condensed stream 113 is sent to separating drum 5 where hydrocarbon is separated from condensed HF and removed via line 142. A portion of the condensed HF is returned to tower 3 as reflux via line 115. Desirably, a feed to reflux volume ratio 1/10 to 1/0.2 may be used in tower 3, preferably a ratio of 1/1. Another portion of the condensed HF is recycled to contacting tower 2 via line 117 for use as solvent. Hydrocarbon stream 142 withdrawn from drum 5 may be recycled to a hydrocarbon conversion zone. The bottoms stream of distillation tower 3 which comprises a mixture of HF and $TaF_5$ is removed via line 119. This mixture may further contain hydrocarbons and/or sulfur impurities. A portion of the mixture is removed via line 121, passed through a reboiler 123 and returned to the distillation tower 3 via line 125 to maintain control of overhead and bottoms compositions.

To remove at least a portion of the sulfur impurities and insoluble hydrocarbons from the bottoms stream of the distillation tower, a portion of the bottoms carried in line 144 is passed to a settling drum 4. In the drum, phase separation occurs to yield an upper non-soluble liquid layer containing hydrocarbons and whch may also contain sulfur impurities and a lower phase which contains HF and $TaF_5$. If a significant amount of sulfur impurities is present in the upper phase, the stream withdrawn from the drum 4 via line 143 may be purged from the system. If the upper phase is substantially free of sulfur impurities, stream 143 may be recycled with stream 142 via line 140 to the hydrocarbon converison zone. The lower phase is removed via line 127 from the settling drum 4 for use, if desired, as catalyst. If desired, a portion thereof may be sent for blending with fresh catalyst and/or a portion thereof may be passed via line 131 into catalyst recycle line 133, that is, catalyst that is recycled into the hydrocarbon conversion zone.

Table I summarizes the composition and feed rates of various streams shown in the figure when operating under the specific conditions summarized in Table II.

TABLE I

| | Moles/hr. | | | | | |
|---|---|---|---|---|---|---|
| | Stream 103 | Stream 105 | Stream 107 | Stream 117 | Stream 127 | Stream 140 |
| $C_5$ | 845 | 845 | 1.6 | | 0.4 | 1.2 |
| $C_6$ | 3,380 | 3,380 | 6.3 | | 1.2 | 5.1 |
| HF | 53.5 | 53.5 | 1,666.0 | 1,458 | 208.0 | |
| $TaF_5$ | 5.3 | 0.006 | 5.3 | Trace | 5.3 | |
| Total | 4,283.8 | 4,278.506 | 1,679.2 | 1,458 | 214.9 | 6.3 |

TABLE II

| | Contacting tower 2 | Distillation tower 3 |
|---|---|---|
| Temperature, °F | 122 | a 100 |
| Pressure, p.s.i.g | 130 | a 13 | a Overhead.

EXAMPLE 1

The following experiment was conducted to show that anhydrous liquid HF is effective to extract trace amounts of $TaF_5$ from hydrocarbon streams. A 300 cc. Hastelloy alloy C (registered trademark of Haynes Stellite Co. for a high temperature nickel based alloy) Autoclave Engineers' autoclave was charged under a nitrogen atmosphere with tantalum pentafluoride (110.4 g., 0.40 mole) and about 90 cc. of hydrocarbon composed of n-hexane (85%), cyclohexane (10%) and benzene (5%). The reactor was then closed and pressured to 150 p.s.i.g. with hydrogen. Hydrogen fluoride (65 g., 3.3 mole) was then added. The reactor was stirred at 400 revolutions per minute, heated to 35° C. and a feed pump was engaged to introduce feed of the composition noted above at a rate of 30 cc. per hour. The hydrocarbon in the reactor was sampled automatically every 20 minutes (10 cc./sample) through lines at reactor temperature into a vessel containing 71 cc. of anhydrous liquid hydrogen fluoride under 145 p.s.i.g. of hydrogen. The hydrocarbon product passed through the hydrogen fluoride wash system and separated as a separate upper phase. This washed hydrocarbon product was automatically sampled seventeen minutes later and passed through a caustic scrubber. Alternatively, the hydrocarbon product could be manually sampled for comparative analysis before and after the hydrogen fluoride system. Some of the analytical results are summarized in Table III. Before the hydrogen fluoride wash, the hydrocarbon product samples of Table III contained between about 1000 and 3000 weight parts per million tantalum.

TABLE III

| Hour: | Hydrocarbon Product After Wash Ta (w.p.p.m.) |
|---|---|
| 29 | 46 |
| 29.5 | 53 |
| 30 | — |
| 48 | — |
| 76 | 100 |
| 100.6 | 200 |
| 121.5 | 100 |
| 145 | 60 |
| 146 | 87 |
| 170 | 70 |
| 193 | — |
| 194 | 82 |
| 195 | 83 |

As can be seen from the experimental results, extraction with anhydrous liquid HF without the utilization of special contacting equipment reduced the level of Ta in the product from an average of about 2000 weight parts per million to below 100 weight parts per million. Elemental and melting point analysis of the species soluble in the hydrogen fluoride product wash solution confirmed that the material extracted was tantalum pentafluoride.

EXAMPLE 2

The procedure of Example 1 was repeated. The results are summarized in Table IV.

TABLE IV

| Hour: | Hydrocarbon Product After Wash Ta (w.p.p.m.) |
| --- | --- |
| 30 | 54 |
| 55 | 91 |
| 77 | 39 |
| 126 | 23 |
| 145 | 106 |
| 176 | 63 |
| 200 | 76 |
| 269 | 99 |
| 318 | 214 |
| 339 | 11 |
| 360 | 171 |
| 442 | 285 |
| 534 | 160 |
| 558 | 101 |
| 604 | 32 |
| 660 | 74 |

In this experiment, samples (10 cc. each) were taken and washed in a dry box in a Teflon (registered trademark of E. I. du Pont de Nemours & Co. for a plastic consisting of tetrafluoroethylene polymer) separatory funnel at room temperature with an equal volume of hydrogen fluoride to simulate a second washing stage. The results of the second hydrogen fluoride wash of hydrocarbon product are summarized in Table V.

TABLE V

| Hour: | Ta (w.p.p.m.) |
| --- | --- |
| 56 | <1 |
| 102 | 2 |
| 151 | 2 |
| 199 | 1 |
| 270 | 6 |
| 335 | 1 |
| 534 | 9 |
| 604 | 6 |
| 675 | 3 |
| 698 | 5 |

What is claimed is:

1. A process for removing a metal pentafluoride selected from the group consisting of tantalum pentafluoride, niobium pentafluoride, and mixtures thereof from a hydrocarbon stream containing the same, which comprises contacting said stream with substantially anhydrous liquid hydrogen fluoride at a temperature in the range of about 0 to 200° F. and at a pressure in the range of about 20 to 250 p.s.i.g., and recovering a hydrocarbon stream having a reduced content of said metal pentafluoride.

2. The process of claim 1, wherein said metal pentafluoride is tantalum pentafluoride.

3. The process of claim 1, wherein the volume ratio of said liquid hydrogen fluoride to said hydrocarbon stream during said contacting step is in the range of about 1:100 to 1:1.

4. The process of claim 1, wherein said contacting is carried out at a temperature of about 65 to 150° F. and a pressure of about 40 to 180 p.s.i.g.

5. The process of claim 1, wherein said metal pentafluoride is present in said hydrocarbon stream in an amount varying from about 5 to 10,000 weight parts per million.

6. A process for recovering a metal pentafluoride selected from the group consisting of tantalum pentafluoride, niobium pentafluoride and mixtures thereof from a hydrocarbon stream containing the same, which comprises contacting said stream with substantially anhydrous liquid hydrogen fluoride in a contacting zone at a temperature in the range of about 0 to about 200° F. and a pressure of about 20 to about 250 p.s.i.g. to form an extract phase comprising said hydrogen fluoride and at least a portion of said metal pentafluoride, and a raffinate phase having a reduced metal pentafluoride content, separating said extract from said raffinate and removing at least a portion of said hydrogen fluoride from the separated extract.

7. The process of claim 6, wherein said contacting zone is a countercurrent liquid-liquid extraction zone.

8. The process of claim 6, wherein said contacting step is conducted in a mixing zone to produce a mixture and wherein said extract phase and said raffinate phase are formed by settling of the mixture.

9. The process of claim 8 wherein said mixing zone comprises at least one countercurrent mixing-settling zone.

10. The process of claim 6, wherein said portion of hydrogen fluoride is removed from said separated extract by distillation.

11. The process of claim 6, wherein said distillation is conducted in a tower wherein the top of the tower is operated at a pressure of about 10 to 30 p.s.i.g. and at a temperature of about 80 to 130° F. and the bottom of the tower is operated at a pressure of about 15 to 45 p.s.i.g. and at a temperature of about 100 to 150° F.

12. The process of claim 11, wherein said tower is refluxed.

13. A process for recovering a metal pentafluoride selected from the group consisting of tantalum pentafluoride, niobium pentafluoride and mixtures thereof from a hydrocarbon stream containing the same in amounts of about 5 to 10,000 weight parts per million, which comprises contacting said stream countercurrently with a selective solvent comprising substantially anhydrous liquid hydrogen fluoride at a solvent to hydrocarbon stream volume ratio in the range of about 1:100 to 1:1, in a contacting zone operated at a temperature of about 0 to 200° F. and a pressure of about 20 to 250 p.s.i.g. to form an extract phase comprising said hydrogen fluoride and at least a portion of said metal pentafluoride, removing at least a portion of said extract phase from said contacting zone, passing said removed extract to a distillation zone operated at an overhead temperature in the range of about 80 to 130° F. and an overhead pressure of about 10 to 30 p.s.i.g., removing overhead from said distillation zone a portion of hydrogen fluoride substantially free of said metal pentafluoride, and removing from the bottom of said distillation zone a mixture comprising said metal pentafluoride and hydrogen fluoride.

14. The process of claim 13, wherein said removed mixture is subsequently passed to a settling zone wherein the mixture is separated into an upper phase and a lower phase, and wherein said lower phase comprising said metal pentafluoride and hydrogen fluoride is recovered from the settling zone.

15. The process of claim 13 wherein said metal pentafluoride is tantalum pentafluoride.

16. In a hydrocarbon conversion process wherein the conversion is conducted in the presence of a catalyst comprising a metal pentafluoride selected from the group consisting of tantalum pentafluoride, niobium pentafluoride and mixtures thereof, and liquid hydrogen fluoride and wherein the conversion zone effluent is separated into a predominantly hydrocarbon phase comprising minor amounts of said metal pentafluoride, and an acid phase, the improvement which comprises contacting said hydrocarbon phase with substantially anhydrous liquid hydrogen fluoride at a temperature in the range of about 0 to 200° F. and a pressure in the range of about 20 to about 250 p.s.i.g. to extract at least a portion of said metal pentafluoride from said hydrocarbon phase, and recovering a hydrocarbon phase having a reduced content of said metal pentafluoride.

17. The process of claim 16, wherein said conversion process is an isomerization process and wherein said hydrocarbon phase comprises a hydrocarbon effluent of said isomerization process.

18. In a hydrocarbon conversion process wherein the conversion is conducted in a conversion zone in the presence of a catalyst comprising a metal pentafluoride selected from the group consisting of tantalum pentafluoride, niobium pentafluoride and mixtures thereof and liquid hydrogen fluoride, and wherein the conversion zone effluent is separated into a hydrocarbon phase comprising minor amounts of said metal pentafluoride and an acid phase, the improvement which comprises, contacting said hydrocarbon phase with a solvent comprising substantially anhydrous liquid hydrogen fluoride in a volume ratio of solvent to hydrocarbon in the range of about 1:100 to 1:1, in a contacting zone operated at a temperature in the range of about 0 to about 200° F. and a pressure of about 20 to 250 p.s.i.g. to form an extract phase comprising said hydrogen fluoride and at least a portion of said metal pentafluoride, withdrawing at least a portion of said extract from said contacting zone and passing the same to a distillation tower, the top of said tower being operated at a pressure in the range of about 10 to 30 p.s.i.g. and a temperature in the range of about 80 to 130° F., removing a portion of said hydrogen fluoride overhead from said tower, recycling at least a portion thereof to said contacting zone, removing a bottoms portion from said tower, said bottoms portion comprising hydrocarbon material, hydrogen fluoride and said metal pentafluoride, passing said bottoms portion to a settling zone to form therein an upper phase comprising said hydrocarbon material and a lower phase comprising said metal pentafluoride and hydrogen fluoride, and withdrawing at least a portion of said lower phase from said settling zone.

19. The process of claim 18, wherein said bottoms portion of the said distillation tower also comprises sulfur-containing material and wherein said upper phase of said settling zone also comprises sulfur-containing material.

20. The process of claim 18 wherein at least a portion of said lower phase withdrawn from said settling zone is recycled to said hydrocarbon conversion zone.

21. The process of claim 20 wherein a portion of said distillation bottoms portion is passed through a reboiler and returned to the bottom of said distillation zone and wherein the weight ratio of HF to said metal pentafluoride is adjusted to obtain a ratio ranging from about 10% to about 100% greater than that required to dissolve substantially all of said metal pentafluoride at the outlet temperature of said reboiler but not less than the ratio desired in said hydrocarbon conversion zone.

References Cited
UNITED STATES PATENTS

| | | | |
|---|---|---|---|
| 2,683,764 | 7/1954 | Lien et al. | 260—674 |
| 2,464,520 | 3/1949 | Lien et al. | 260—674 |
| 3,203,892 | 8/1965 | Kimberlin et al. | 208—252 |
| 3,036,968 | 5/1962 | Gatsis | 208—251 |
| 3,245,902 | 4/1966 | Adams et al. | 208—252 |
| 2,683,763 | 7/1954 | Lien et al. | 208—280 |
| 3,201,494 | 8/1965 | Oelderik et al. | 260—683.47 |

DELBERT E. GANTZ, Primary Examiner

J. M. NELSON, Assistant Examiner

U.S. Cl. X.R.

208—252, 280, 262; 260—683.74